(12) United States Patent
Titomanlio

(10) Patent No.: US 11,624,367 B2
(45) Date of Patent: Apr. 11, 2023

(54) CENTRIFUGAL PUMP AND METHOD OF ADJUSTING THE DISTANCE OF THE WEAR PLATE FROM THE IMPELLER OF A CENTRIFUGAL PUMP

(71) Applicant: Varisco S.r.l., Padua (IT)

(72) Inventor: Antonio Titomanlio, Villafranca di Verona (IT)

( * ) Notice: Subject to any disclaimer, the term of this patent is extended or adjusted under 35 U.S.C. 154(b) by 0 days.

(21) Appl. No.: 16/490,578

(22) PCT Filed: Mar. 3, 2017

(86) PCT No.: PCT/IB2017/051259
§ 371 (c)(1),
(2) Date: Sep. 2, 2019

(87) PCT Pub. No.: WO2018/158617
PCT Pub. Date: Sep. 7, 2018

(65) Prior Publication Data
US 2020/0018315 A1 Jan. 16, 2020

(51) Int. Cl.
*F04D 7/04* (2006.01)
*F04D 15/00* (2006.01)
(Continued)

(52) U.S. Cl.
CPC .......... *F04D 7/04* (2013.01); *F04D 15/0033* (2013.01); *F04D 29/4293* (2013.01); *F04D 29/605* (2013.01); *B32B 2307/554* (2013.01); *B32B 2311/30* (2013.01); *F04D 29/4286* (2013.01); *F04D 29/622* (2013.01); *F04D 29/628* (2013.01)

(58) Field of Classification Search
CPC .... F04D 7/04; F04D 15/0033; F04D 29/4286; F04D 29/622; F04D 29/628; F04D 29/426; F04D 29/4293; F04D 29/605; B32B 2307/554; B32B 2311/30; E05D 3/022
See application file for complete search history.

(56) References Cited

U.S. PATENT DOCUMENTS 1,735,754 A * 11/1929 Hargis ................ F04D 29/4286
415/128
1,743,916 A    1/1930 Hargis
(Continued)

FOREIGN PATENT DOCUMENTS

EP    0307797    3/1989
FR    2290133    5/1976

*Primary Examiner* — Bryan M Lettman
(74) *Attorney, Agent, or Firm* — Themis Law

(57) ABSTRACT

A centrifugal pump for lifting clean water or water with suspended solids includes a hollow body having a front opening, a volute with a delivery port, and an impeller accommodated in the body and designed to be coupled to a motor, with blades tips substantially coplanar at an annular peripheral area. A cover of the front opening includes a flange, an annular wear plate, rigidly joined to the flange and located at a predetermined axial distance from an annular peripheral area of the impeller, and an adjustment system, mounted onto the flange and accessible from the outside, to controllably adjust the axial distance of the wear plate, and to both calibrate the axial position of the wear plate and lock the wear plate in the calibrated position. A method of adjusting the axial distance of the wear plate from an impeller in a centrifugal pump.

11 Claims, 4 Drawing Sheets

(51) Int. Cl.
  *F04D 29/42* (2006.01)
  *F04D 29/60* (2006.01)
  *F04D 29/62* (2006.01)

(56) References Cited

U.S. PATENT DOCUMENTS

| | | | | |
|---|---|---|---|---|
| 1,878,429 A | * | 9/1932 | Staup | F04D 29/167 |
| | | | | 415/128 |
| 2,365,058 A | * | 12/1944 | Crawford | F04D 29/167 |
| | | | | 415/196 |
| 8,430,260 B2 | * | 4/2013 | Guidry, Jr. | B01J 3/03 |
| | | | | 220/298 |
| 2007/0036643 A1 | * | 2/2007 | Arnold | F04D 29/167 |
| | | | | 415/131 |
| 2016/0245291 A1 | * | 8/2016 | Carnes | F04D 9/02 |

* cited by examiner

CENTRIFUGAL PUMP AND METHOD OF ADJUSTING THE DISTANCE OF THE WEAR PLATE FROM THE IMPELLER OF A CENTRIFUGAL PUMP

FIELD OF THE INVENTION

The present invention generally finds application in the field of fluid machines and particularly relates to a centrifugal pump for lifting clean water or water with suspended solids.

The invention further relates to a method of adjusting the distance of the wear plate from the impeller of a centrifugal pump.

BACKGROUND ART

Wear plates have been long known to be used in fluid machines and centrifugal pumps, and to be coupled to the suction flanges of the covers to reduce their wear and extend the life of the pump.

Particularly, the wear plates are mounted to the flanges at the inner impeller-facing surface, and shield the inner surface of the flange from suspended solids impacting thereupon as the liquid is lifted.

Wear plates are internally coated with an antifriction material, e.g. Teflon, and are situated at a predetermined axial distance from the impeller blades, which is known in the art as "wear clearance".

Such axial distance must not exceed a minimum value to preserve the efficiency of pump performance.

When the wear clearance exceeds the minimum value, e.g. due to wear of the plate, a considerable liquid pressure difference is produced between the inlet and the outlet of the pump, and leakage occurs.

In an attempt to at least partially obviate these drawbacks, centrifugal pumps have been developed with means for manual wear clearance adjustment.

These pumps comprise rubber seals or Teflon rings to be fitted into the rear side of the pump between the motor-bearing element and the pump body or in the rear side of the impeller.

The wear clearance may be adjusted by moving the impeller relative to the wear plate using seals or Teflon rings of different thicknesses.

A first drawback of this arrangement is that an operator is required o disassemble the pump body to fit the seals and adjust the wear clearance.

This drawback adds complexity to maintenance and assembly procedures, thereby extending the overall process times.

A further drawback is that seals of different thicknesses are often difficult to find on site.

Another drawback is that rubber seals and Teflon rings have the characteristic of being subject to deformation with time, leading to an undesired variation of the tolerances prescribed by the pump unit manufacturer.

A further drawback is that the seals and the rings are prone to rapid wear, and must be periodically replaced by the operator to ensure consistent pump performance.

Yet another drawback is that the disassembly procedures involves removal of the suction flange which is not connected to the pump unit and must be moved using appropriate lifting equipment.

Technical Problem

In view of the prior art, the technical problem addressed by the present invention consists in providing a centrifugal pump that affords quick and simple initial adjustment of the distance between the wear plate and the impeller, as well as quick and simple maintenance.

DISCLOSURE OF THE INVENTION

The object of the present invention is to solve the above mentioned technical problem, by providing a centrifugal pump and a method of adjusting the distance of the wear plate from the impeller in a centrifugal pump that are highly efficient and relatively cost-effective.

A particular object of the present invention is to provide a centrifugal pump as discussed above that affords simple and quick adjustment of the axial distance between the wear plate and the impeller during assembly of the pump.

Another object of the present invention is to provide a centrifugal pump of the aforementioned type, that can adjust the axial distance in a time-consistent manner.

A further object of the present invention is to provide a centrifugal pump of the aforementioned type, that affords quick and simple maintenance.

Yet another object of the present invention is to provide a centrifugal pump of the aforementioned type, that requires no particular skill of the operator during axial distance adjustment.

A further object of the present invention is to provide a centrifugal pump of the aforementioned type, that can reduce the overall operation time.

Another object of the present invention is to provide a centrifugal pump of the aforementioned type, that can avoid handling of heavy parts.

A further object of the present invention is to provide a centrifugal pump of the aforementioned type that affords direct on-site inspection of the interior of the pump body without using lifting equipment.

These and other objects, as more clearly explained below, are fulfilled by a centrifugal pump for lifting clean water and water with suspended solids as defined in claim 1, which comprises a hollow body defining a center axis and having a volute with a radial delivery port and a front opening, and an impeller accommodated in the body and designed to be coupled to a motor to rotate about the center axis and comprising a plurality of blades whose tips areas substantially coplanar at an annular peripheral area.

A cover is also provided for closing the front opening, which comprises a flange with a central portion designed to be fitted into the front opening and having a suction port, a radial portion ad a wear plate that is rigidly joined to the flange and is located at a predetermined axial distance from the annular peripheral area of the impeller. The pump comprises means for adjusting the axial distance of the wear plate.

The adjustment means are mounted to the flange, can be accessed from the outside, and are designed to both calibrate the axial position of the wear plate and to lock the latter in the calibrated position.

According to a further aspect, the invention provides a method of adjusting the predetermined axial distance of the wear plate from the impeller in a centrifugal pump.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a centrifugal pump for lifting clean water or water with suspended solids, which is described as a non-limiting example with the help of the annexed drawings, in which.

DETAILED DESCRIPTION OF A PREFERRED EXEMPLARY EMBODIMENT

Figure 1:
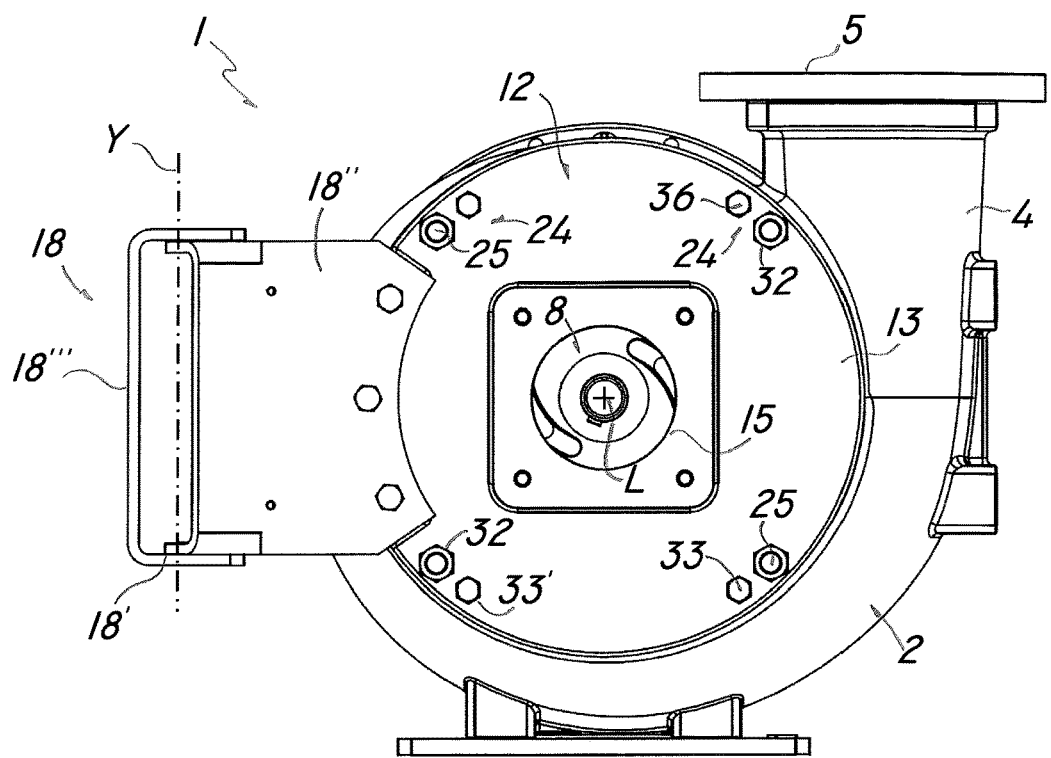
FIGS. 1 and 2 are front and perspective views of the centrifugal pump of the invention in a first operational configuration respectively.
Figure 2:
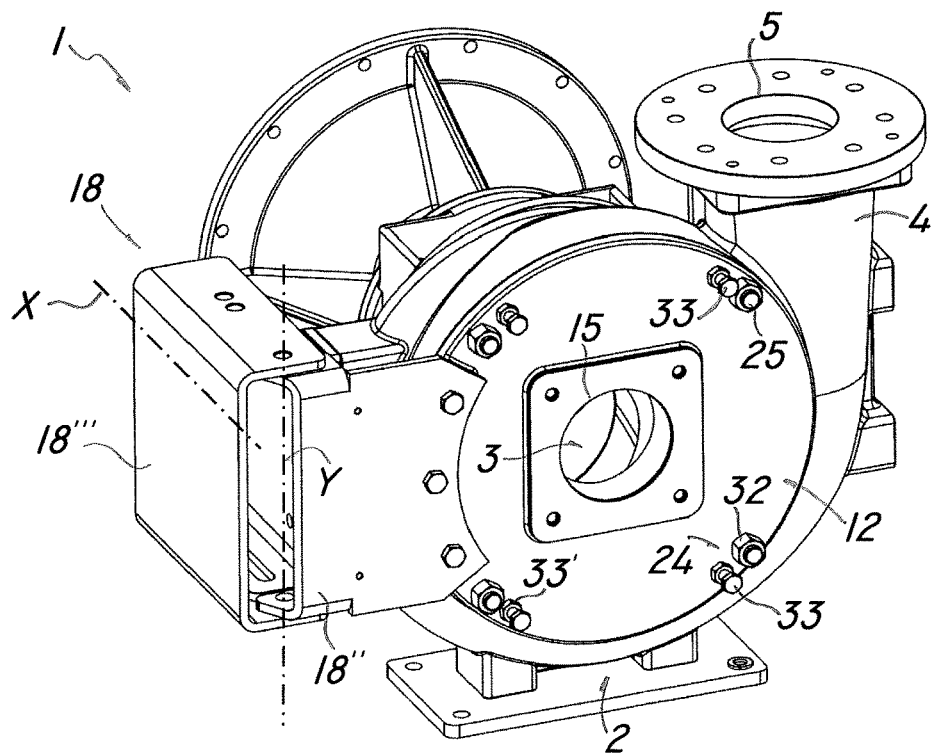

Particularly referring to the figures, there is shown a centrifugal pump, generally designated by numeral 1, for lifting clean water or water with suspended solids.

The centrifugal pump 1 of the present invention may be installed, for instance, in building and industrial drainage plants, for pumping water drawn from the soil.

In a preferred embodiment of the invention, the centrifugal pump 1 comprises a hollow body 2 defining a longitudinal axis L and having a front opening 3 and a volute 4 with a radial delivery port 5.

As is known per se, the delivery port 5 may be connected to a delivery pipe, not shown, for discharging the liquid.

Furthermore, the front opening 3 may be radially delimited by a radial wall 6 with a respective front surface 7, as best shown in FIGS. 4 to 11.

An impeller 8 is accommodated inside the hollow body 2 and is adapted to be coupled to a motor, not shown, to be rotated thereby.

The impeller 8 comprises a plurality of radial blades 9 whose respective tips 10 are substantially coplanar at an annular peripheral area 11.

The pump 1 comprises a cover 12 for closing the front opening 3, which consists of a flange 13 with a central portion 14 having a substantially axial suction port 15 for drawing in the liquid, and a substantially radial peripheral portion 16.

As the hollow body 2 is closed, the central portion 14 of the flange 13 will be sealingly fitted into the front opening 3, whereas the front surface 17 of the peripheral portion 16 will abut the front surface 7 of the radial wall 6 of the hollow body 2.

Advantageously, as described above concerning the delivery port 5, the suction port 15 may be connected to a liquid supply pipe, not shown.

The cover 12 may be connected to the body 2 with hinge means 18 having a hinge axis Y substantially transverse to the vertical center axis L, such that the body 2 may be opened and accessed without having to move heavy parts.

Figure 3:
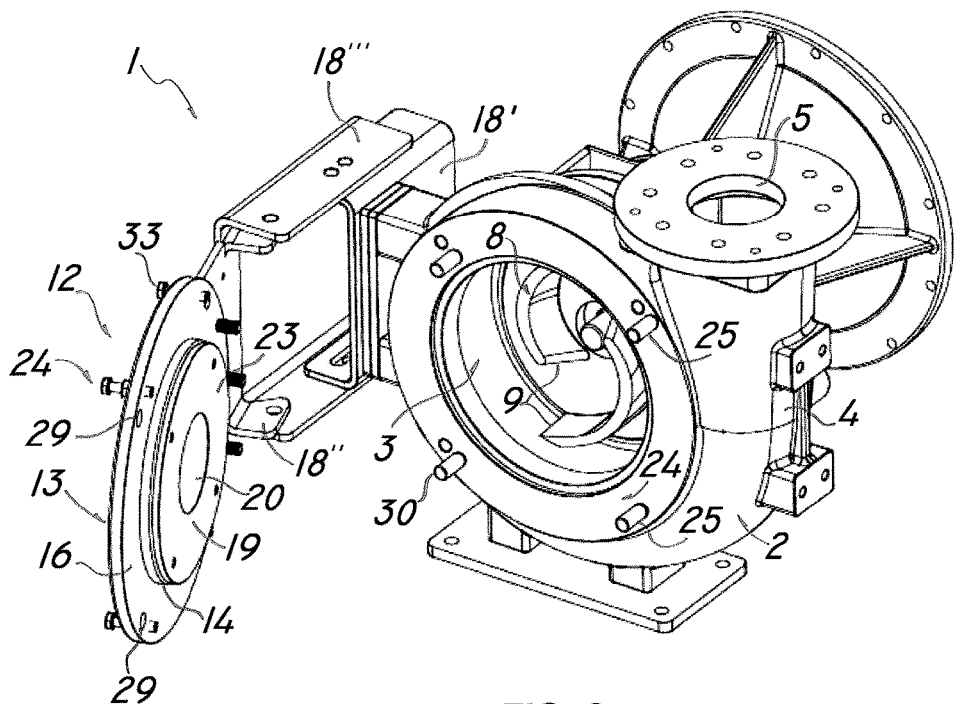
FIG. 3 is a perspective view of the centrifugal pump in a second operating configuration.

As best shown in FIG. 3, the hinge means 18 may comprise a first end member 18' secured to the body 2 and a second end member 18" integral with the cover 12.

Furthermore, an intermediate member 18''' is mounted to the first end member 18' and is able to slide therealong in a respective longitudinal direction X parallel to the center axis L, the second end member 18" pivots thereupon.

As best shown in FIG. 3, the first end member 18' and the intermediate member 18''' may consist of respective U brackets whereas the second end member 18" may consist of a plate.

As the pump 1 is opened, the intermediate member 18''' will be simply translated relative to the first end member 18' in the longitudinal direction X, and the second end member 18" will be rotated with the cover 12 relative to the intermediate member 18''' about the vertical axis Y.

The pump 1 comprises a substantially annular wear plate 19, rigidly joined to the flange 13 and located at a predetermined axial distance $d_1$, also known as wear clearance, from the annular peripheral area 11 of the impeller 8.

Namely, the wear plate 19 comprises a central hole 20, which corresponds to the suction port 15 and can be aligned therewith during assembly.

Furthermore, the plate 19 is fixed to the flange 13, particularly to its central portion 14, by means of a plurality of radially arranged anchor screws 21, whose heads 22 are coplanar with the inner surface 23 of the plate 19 which faces the impeller 8.

The wear plate 19 may be made of a high-strength material selected from the group comprising cast-iron, marine bronze and stainless steel and the inner surface 23 may be coated with one or more layers of anti-scratch rubber, not shown.

The rubber layers are prone to wear and will be worn out after a predetermined number of pumping cycles, particularly as a result of the friction generated by the liquid-suspended solids.

Therefore, an operator is required to periodically service the wear plate 19 by removing the anchor screws 21 and replacing it with a new plate 19 with an intact coating layer.

Adjustment means 24 are also provided, for controlled adjustment of the axial distance $d_1$ of the wear plate 19 from the impeller 8.

In a peculiar aspect of the invention, the adjustment means 24 are mounted to the flange 13 of the cover 12, can be accessed from the outside, and are designed to both calibrate the axial position of the wear plate 19 and to lock the latter in the calibrated position.

Thus, the axial distance $d_1$ will be adjusted in a very simple and quick manner, without acting upon the impeller 8 within the body 2 of the pump 1 and without having the move the heavy parts thereof.

Furthermore, the adjustment means 24 will maintain a consistent optimal axial distance $d_1$ for a long time, to prevent sudden pressure changes and liquid leakage.

Preferably, as best shown in FIGS. 4 to 11, the adjustment means 24 comprise a plurality of studs 25 with first threaded ends 26 tightened in a first ring of matingly threaded holes 27. The first matingly threaded holes 27 are formed in the radial wall 6 of the body 2 at the periphery of the front opening 3.

The studs 25 comprise respective smooth intermediate portions 28, which are designed to extend through a second ring of corresponding smooth through holes 29 formed in the peripheral portion 16 of the flange 13 and respective threaded ends 30 with a predetermined pitch p.

The second ends 30 are adapted to project out of the outer face 31 of the peripheral portion 16 of the flange 13 and are equipped with a plurality of calibration stop nuts 32 which are adapted to be tightened on the corresponding second threaded ends 30.

Particularly, the stop nuts 32 are adapted to be tightened on the second ends 32 of the studs 25 to move from a locked position, in contact with the outer surface 31 of the flange 13, to a calibrated position, at a minimum reference distance $d_2$, having a predetermined value, from the flange 13, and vice versa.

Advantageously, the predetermined value for the minimum reference distance $d_2$ may be precisely set and corresponds to the product of the predetermined pitch p of the second threaded ends 30 of the studs 25 by the number of turns, or by a fraction of a turn, by screwing and unscrewing the stop nuts 32.

The adjustment means 24 may further comprise a plurality of thrust screws 33, that are tightened into a corresponding third ring of matingly threaded through holes 34 formed at the periphery 16 of the flange 13.

Figure 5:
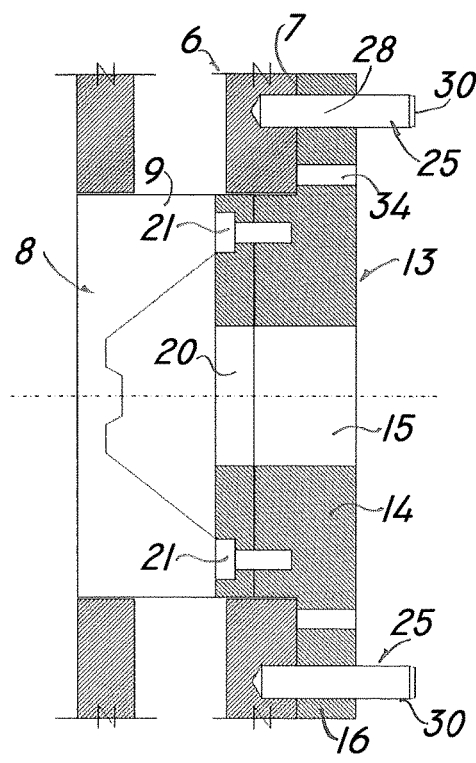

As best shown in FIGS. 3 and 5, the holes of the second 29 and third 34 rings may be formed in the peripheral portion 16 of the flange 13 at equal and radially offset angular distances.

The embodiment as shown in FIGS. 3 and 5 uses four studs 25 and four thrust screws 33, fitting into respective holes 29, 34 for adjustment of the axial distance $d_1$.

Nevertheless, the number of thrust screws 33 and studs 25 may be different from that of the figures, without departure from the scope of the present invention.

The thrust screws 33 have respective inner ends 35 which are adapted to interact with the front surface 7 of the radial wall 6 of the body 2, and respective heads 36 in longitudinally opposite positions, projecting out of the outer surface 31 of the flange 13.

The head 36 of each thrust screw 33 has such a shape as to be driven by a tool, such that the screws 33 will be tightened and the flange 13 will be axially pushed outwards, with the wear plate 19 rigidly joined thereto, by an axial distance $d_1$ equal to the minimum reference distance $d_2$ to the calibrated position.

Furthermore, each thrust screw 33 may comprise a respective lock nut 33' at its respective head 36, which may be tightened on the screw 33 to lock the flange 13 in the calibrated position upon axial displacement thereof.

According to a further aspect, the invention provides a method of adjusting the predetermined axial distance of a wear plate 19 from an impeller 8 in a centrifugal pump 1 of the above discussed type.

Figure 4:
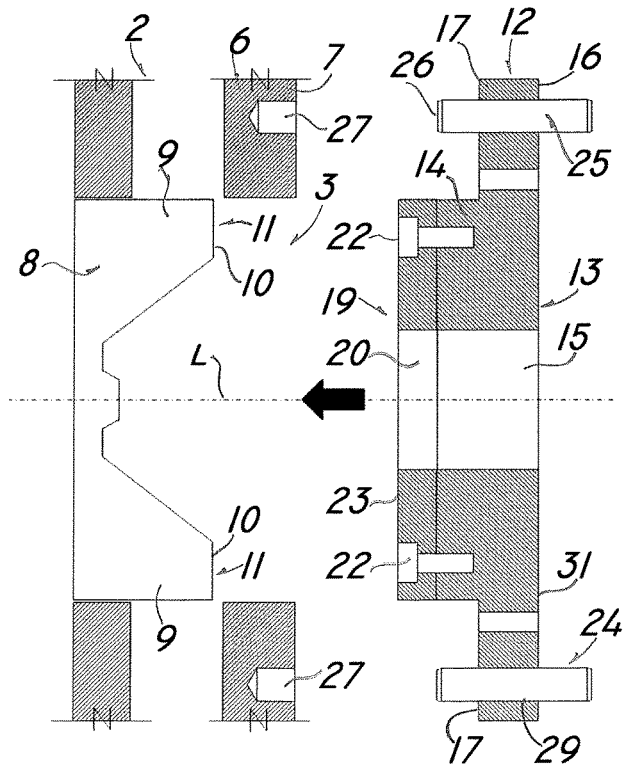
FIGS. 4 to 11 are sectional bottom views, as taken along a plane I-I, of a method of adjusting the axial distance in a centrifugal pump of the invention.

The method includes a step of a) closing the cover 12 on the body 2 of the pump 1 by tightening the first threaded ends 26 of the studs 25 into the holes of the first ring 27 of the body 2 and fitting them into the smooth through holes 29 of the flange 13, as shown in FIGS. 4 and 5.

In this position, the front surface 17 of the peripheral portion 16 of the flange 13 contacts the front surface 7 of the body 2 and the inner surface 23 of the wear plate 19 contacts the tops 10 of the blades 9 of the impeller 8.

Figure 6:
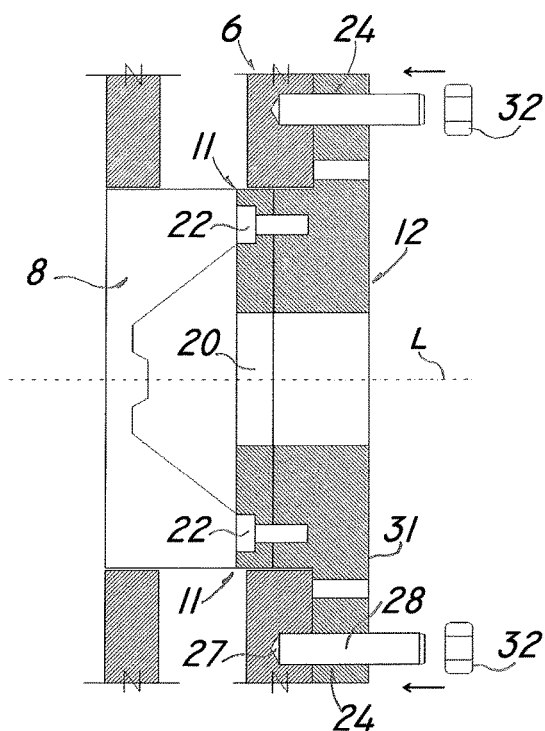
Figure 7:
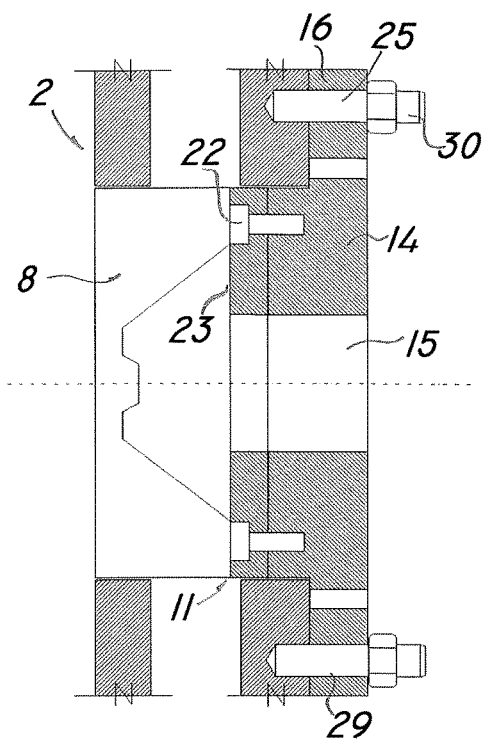

The above step is followed by a step of b) tightening the calibration stop nuts 32 on the second threaded ends 30 of the studs 25 to contact with the outer surface 31 of the flange 13 and keeping the cover 12 in contact with the hollow body 2 in the above described position, as shown in FIGS. 6 and 7.

Figure 8:
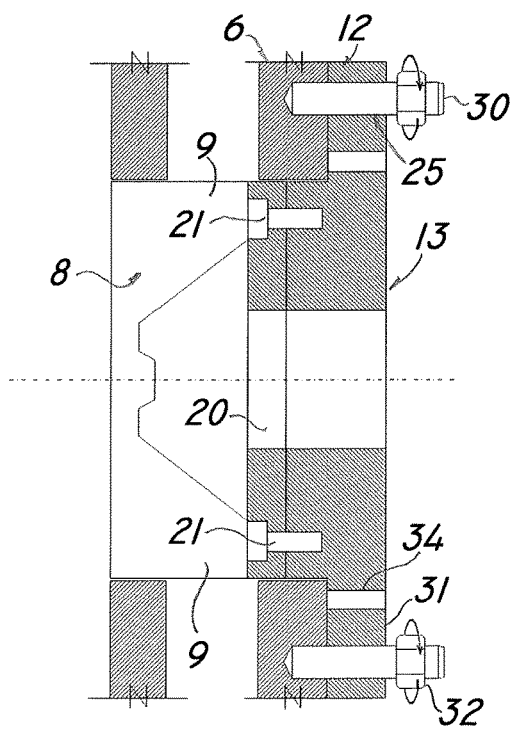
Figure 9:
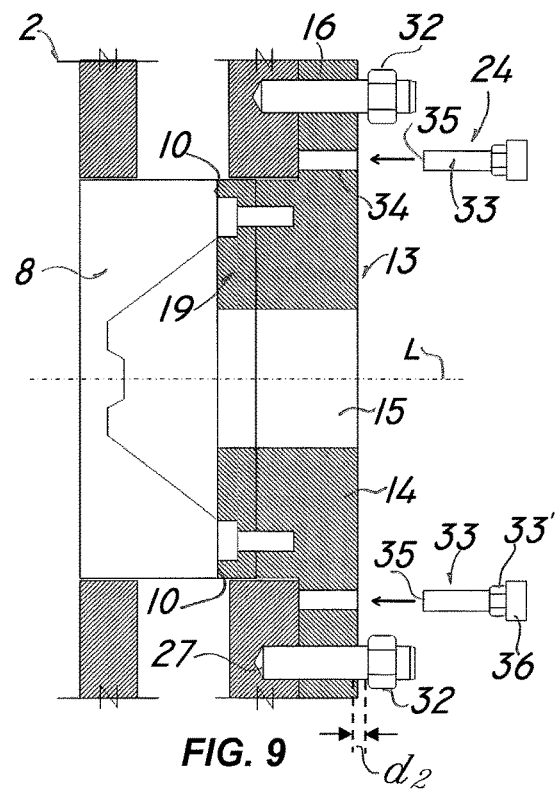

The method includes a step, as shown in FIG. 8, of c) loosening the nuts 32 by a number of turns or fractions of a predetermined turn to move them away from the outer surface 31 of the flange 13 to a calibrated position at a predetermined minimum reference distance $d_2$ and a step, as shown in FIG. 9, of d) tightening the thrust screws 33 with their respective lock nuts 33' into the third ring of matingly threaded holes 34 to move the inner ends 35 thereof to contact with the front surface 7 of the body 2.

Figure 10:
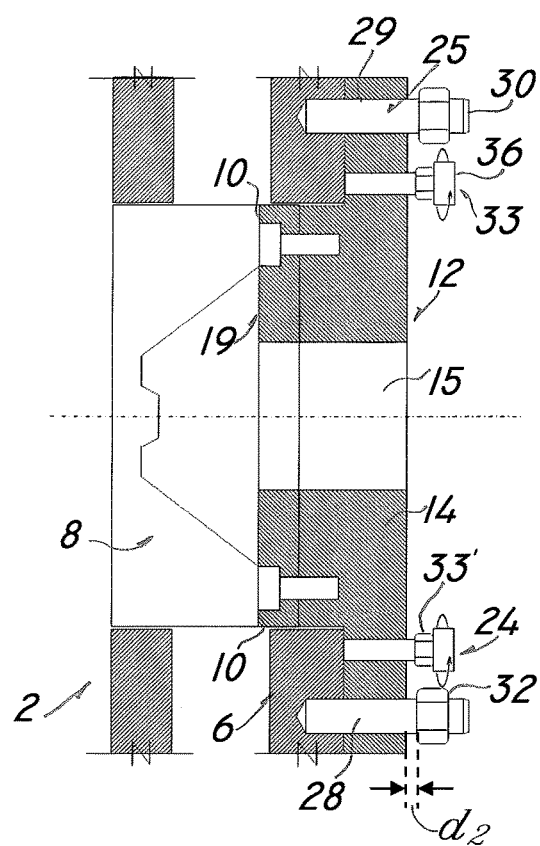
Figure 11:
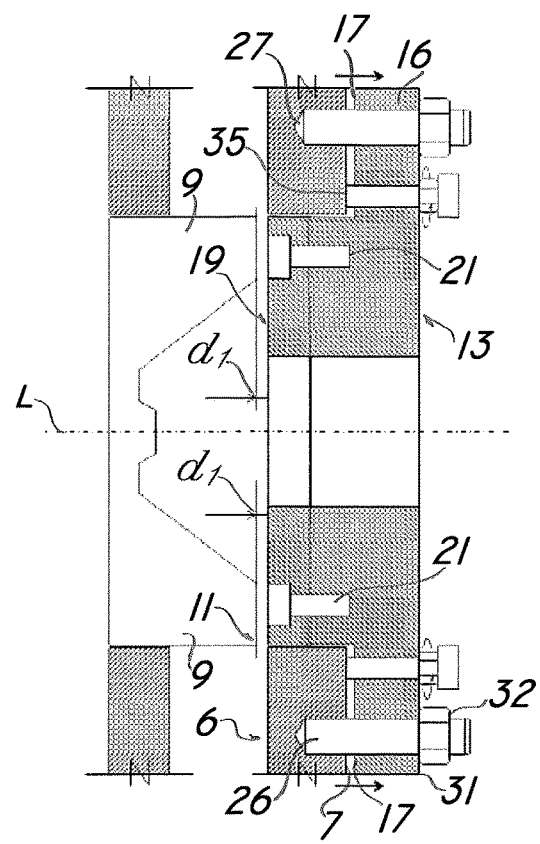

A step is further provided, as shown in FIG. 10, of e) further tightening the thrust screws 33 to move the flange 13 away from the front surface 7 and, as a result, to move the wear plate 19 away from the annular peripheral area 11 of the impeller 8 by an axial distance $d_1$ equal to the minimum reference distance $d_2$ as shown in FIG. 11.

The method comprises a step of f) tightening the lock nuts 33' on the respective thrust screws 33 to lock the flange 13 in the calibrating position upon axial displacement thereof, as shown in FIG. 11.

The number of turns or fractions of a turn for loosening the nuts 32 is determined by an algorithm that depends on the value assigned to the axial distance $d_1$ of the wear plate 19 from the impeller 8 and on the pitch p of the second threaded ends 30 of the studs 25.

The algorithm consists of the following formula:

$$R=N/p$$

where N is the number of turns or fractions of a turn;
R is the axial distance $d_1$ of the wear plate 19 from the impeller 8 and
P is the predetermined pitch p of the threads of the second ends 30 of the studs 25.

For example, the predetermined pitch of an ISO M16 stud bolt 25, as used in the present invention, is 2 mm. Therefore, in order to obtain an axial distance R of the wear plate 19 from the impeller of 1 mm, the nuts 32 will be simply loosened by half a turn (N=½).

The wear plate 19 is moved away from the tops 10 of the blades 9 of the impeller 8 until the outer surface 31 of the flange 13 abuts the nuts 32 in the calibrated position.

Advantageously, before closing the cover 12, the actual value of the axial distance $d_1$ between the wear plate 19 and the tops 10 of the blades 9 of the impeller 8 is detected.

The above disclosure clearly shows that the centrifugal pump and the method of adjusting the axial distance between the wear plate and the impeller fulfill the intended objects, and particularly allow such distance to be adjusted in a simple and consistent manner.

The centrifugal pump and method of the invention are susceptible to a number of changes and variants, within the inventive concept disclosed in the annexed claims.

While the pump and method have been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be produced on an industrial scale in fluid machine manufacturing plants.

The invention claimed is:
1. A centrifugal pump (1) for lifting clean water or water with suspended solids, comprising:
    a hollow body (2) defining a center axis (L), said hollow body (2) having a front opening (3) defined in a radial wall (6) and a volute (4) with a radial delivery port (5);
    an impeller (8) accommodated in said hollow body (2), said impeller (8) having blades (9) whose tips (10) are substantially coplanar at an annular peripheral area (11);
    a cover (12) for closing said front opening (3), said cover (12) comprising a flange (13) disposed to overlay said radial wall (6), said flange having a disc shaped central portion (14) facing an outer environment, and a peripheral portion (16) extending radially from said disc shaped central portion (14);
    a substantially annular wear plate (19), directly affixed to a rear of said disc shaped central portion (14) of said flange (13);

wherein said disc shaped central portion (14) of said flange (13) has a central hole (20) providing a substantially axial suction port (15);

wherein said substantially annular wear plate (19) is located at an axial distance ($d_1$) from the tips (10) of the blades (9), the axial distance ($d_1$) being maintained at a predetermined value to prevent sudden changes and leakage of the clean water or of the water with suspended solids; and an adjustment system (24) for controlled adjustment of said axial distance ($d_1$) of said wear plate (19);

wherein said adjustment system (24) is mounted onto said flange (13) and is accessible from outside, said adjustment system (24) being configured to both calibrate said axial distance ($d_1$) of said wear plate (19) and to lock said wear plate (19) at said axial distance ($d_1$);

wherein said adjustment system (24) comprises a plurality of studs (25) with first threaded ends (26) tightened into a first ring of matingly threaded holes (27) formed in said hollow body (2) at a periphery of said front opening (3), wherein said studs (25) have intermediate smooth portions (28), which are adapted to pass through a second ring of corresponding smooth through holes (29) formed in the peripheral portion (16) of said flange (13);

wherein said adjustment system further comprises second threaded ends (30) with a predetermined pitch (p), which are configured to project out of said peripheral portion (16) of said flange (13) and on which corresponding calibration stop nuts (32) are tightened;

wherein said adjustment system causes a movement of said flange (13), with said substantially annular wear plate (19) affixed thereto, in relation to said radial wall (6) after the closing of said cover;

wherein said cover (12) is connected to said hollow body (2) by a hinge (18) having a hinge axis (Y) that is substantially vertical and perpendicular to the center axis (L) of said hollow body (2); and wherein said hinge (18) consists of a first end member (18') affixed to said hollow body (2), a second end member (18") directly affixed to the cover (12), and an intermediate member (18''') slidingly mounted to said first end member (18') so as to slide along a respective longitudinal direction, said second end member (18") being disposed to be pivoted thereupon about said hinge axis (Y), to allow said cover (12) to be opened by a longitudinal sliding motion and a pivoting motion, for easy inspection and maintenance of said hollow body (2).

2. The centrifugal pump as claimed in claim 1, wherein said calibration stop nuts (32) are configured to be loosened on the second threaded ends (30) of said studs (25) to move said flange (13) from a locked position in contact with said radial wall (6) to a position wherein said wear plate (19) is at said axial distance ($d_1$) from said impeller (6) and the flange (13) is at a predetermined distance away from said radial wall (6).

3. The centrifugal pump as claimed in claim 2, wherein said predetermined distance corresponds to a product of the pitch (p) of said second threaded ends (30) of the studs (25) and a number of tightening/loosening turns of said calibration stop nuts (32).

4. The centrifugal pump as claimed in claim 3, wherein said adjustment system (24) further comprise a plurality of thrust screws (33), which are tightened into a corresponding third ring of matingly threaded through holes (34) formed in said peripheral portion (16) of said flange (13), and wherein the movement of said flange (13), with said substantially annular wear plate (19) affixed thereto, in relation to said radial wall (6), is enabled by said thrust screws (33) pushing against said radial wall (6).

5. The centrifugal pump as claimed in claim 4, wherein said thrust screws (33) have inner ends (35) designed to interact with a front surface (7) of said radial wall (6) and a head (36) that projects out of an outer surface (31) of said flange (13).

6. The centrifugal pump as claimed in claim 5, wherein said head (36) has a shape configured to be driven by a tool, such that said plurality of thrust screws (33) are adapted to be tightened and the flange (13) and said wear plate (19) to be axially pushed outwards by said axial distance ($d_1$) that is equal to a minimum reference distance ($d_2$).

7. The centrifugal pump as claimed in claim 6, wherein each thrust screw (33) has a lock nut (33') proximate to said head (36) for locking said wear plate (19) at the axial distance ($d_1$).

8. A method of adjusting the axial distance ($d_1$) of the wear plate (19) from the impeller (8) of the centrifugal pump (1) as claimed in claim 7, comprising:

providing the cover (12) for closing the front opening (3);

providing, in the disc shaped central portion (14) of the cover (12), the central hole (20) and aligning the central hole with the substantially axial suction port (15) during assembly;

connecting the cover (12) to the hollow body (2) with the hinge (18) having the hinge axis (Y) that is substantially vertical and perpendicular to the center axis (L) of the hollow body (2);

closing the cover (12) on the hollow body (2) by tightening said plurality of studs (25) into said first ring of threaded holes (27) of said hollow body (2) and fitting said plurality of studs (25) into the second ring of smooth through holes (29) of said flange (13);

screwing respective calibration stop nuts (32) on the second threaded ends (30) of said plurality of studs (25) to bring said flange (13) in contact engagement with the front surface (7) of said radial wall (6);

thereafter, unscrewing said calibration stop nuts (32) by a number of turns or fractions of a predetermined turn to move said calibration stop nuts (32) away from the outer surface (31) of said flange (13) to a calibrated position at a predetermined minimum reference distance ($d_2$);

thereafter, tightening said plurality of thrust screws (33) with their respective lock nuts (33') into said third ring of matingly threaded through holes (34) to bring the inner ends (35) thereof in contact engagement with the front surface (7) of said radial wall (6);

further screwing said plurality of thrust screws (33) to move the flange (13) away from said front surface (7) and, as a result, to move said wear plate (19) away from the annular peripheral area (11) of said impeller (8) by said axial distance ($d_1$), that is equal to said minimum reference distance ($d_2$) to a calibrated position; and screwing said lock nuts (33') on said thrust screws (33) to lock said flange (13) in said calibrated position;

wherein the number of turns or fractions of a turn for loosening said calibration stop nuts (32) is determined by an algorithm that depends on a value assigned to the axial distance ($d_1$) of said wear plate (19) from said impeller (8) and on the pitch (p) of said second threaded ends (30) of said studs (25).

9. The method as claimed in claim 8, wherein said algorithm consists of the following formula $R = N/p$ wherein
N=the number of turns or fractions of a turn,
R=the axial distance ($d_1$) of the wear plate (19), and
p=the pitch of the threads of the second threaded end (30) of the studs (25).

10. The centrifugal pump as claimed in claim 4, wherein the through holes of said second (29) and third (34) rings are radially spaced apart from one another at equal angular distances.

11. The centrifugal pump as claimed in claim 1, wherein said wear plate (19) comprises a central hole (20) corresponding to said suction port (15) and is fixed to said flange (13) via a plurality of anchor screws (21) having heads (22) coplanar with an inner surface (23) of said wear plate (19).

* * * * *